United States Patent
Ichida et al.

(10) Patent No.: US 12,319,569 B2
(45) Date of Patent: Jun. 3, 2025

(54) CUBIC BORON NITRIDE POLYCRYSTALLITE AND METHOD FOR PRODUCING THE SAME

(71) Applicant: NISSAN MANUFACTURING GROUP CO., LTD., Kyotango (JP)

(72) Inventors: Yoshio Ichida, Kyotango (JP); Tetsuo Irifune, Matsuyama (JP); Hiroaki Ohfuji, Sendai (JP); Yasuo Tomita, Kyotango (JP)

(73) Assignee: Nissin Manufacturing Group Co., Ltd, Kyotango (JP)

( * ) Notice: Subject to any disclaimer, the term of this patent is extended or adjusted under 35 U.S.C. 154(b) by 0 days.

(21) Appl. No.: 18/748,480

(22) Filed: Jun. 20, 2024

(65) Prior Publication Data

US 2024/0425372 A1 Dec. 26, 2024

(30) Foreign Application Priority Data

Jun. 22, 2023 (JP) .................. 2023-102724

(51) Int. Cl.
*C01B 21/064* (2006.01)
*B24D 5/02* (2006.01)
(Continued)

(52) U.S. Cl.
CPC .............. *C01B 21/064* (2013.01); *B24D 5/02* (2013.01); *C09K 3/1409* (2013.01); *G01N 3/40* (2013.01);
(Continued)

(58) Field of Classification Search
CPC ...... C01B 21/064; B24D 5/02; C09K 3/1409; G01N 3/40
See application file for complete search history.

(56) References Cited

U.S. PATENT DOCUMENTS

| | | |
|---|---|---|
| 2018/0265416 A1 | 9/2018 | Ishida et al. |
| 2020/0247673 A1 | 8/2020 | Hirano et al. |
| 2021/0309579 A1 | 10/2021 | Ishida et al. |

FOREIGN PATENT DOCUMENTS

| | | |
|---|---|---|
| JP | 2010-137997 A | 6/2010 |
| JP | 2014-080323 A | 5/2014 |

(Continued)

OTHER PUBLICATIONS

Ichida et al., "Microstructure and mechanical properties of nanopolycrystalline cBN", 60th High Voltage Symposium Abstracts, Oct. 24, 2019, 3 pages.

(Continued)

*Primary Examiner* — James A Fiorito
(74) *Attorney, Agent, or Firm* — Sughrue Mion, PLLC

(57) ABSTRACT

A cubic boron nitride (cBN) polycrystallite includes: a fine-grained cBN crystal of 10-60 nm in grain size; a coarse-grained cBN crystal of 100-250 nm in grain size; and a lamellar crystal consisting of stacked plate-like crystals of cBN with the maximum length perpendicular to the stacking direction not larger than 1000 nm and an aspect ratio smaller than 3, where the aspect ratio is defined as the maximum length divided by a maximum length in the stacking direction, and a mean grain size of the fine-grained, coarse-grained and lamellar crystals is not larger than 80 nm. This cBN polycrystallite can be obtained by performing, under 10 GPa or lower, heating a material made of hexagonal system boron nitride to a first temperature within 1300°-1600° C., maintaining it for a first predetermined period, heating it to a second temperature within 1700°-2100° C., maintaining it for a second predetermined period, and cooling it.

10 Claims, 6 Drawing Sheets

(51) Int. Cl.
*C09K 3/14* (2006.01)
*G01N 3/40* (2006.01)

(52) U.S. Cl.
CPC ...... *C01P 2002/60* (2013.01); *C01P 2002/72* (2013.01); *C01P 2002/76* (2013.01); *C01P 2004/04* (2013.01)

(56) References Cited

FOREIGN PATENT DOCUMENTS

| | | |
|---|---|---|
| JP | 2016-141609 A | 8/2016 |
| JP | 6818966 B1 | 1/2021 |
| WO | 2018/088369 A1 | 5/2018 |
| WO | 2019/244894 A1 | 12/2019 |

OTHER PUBLICATIONS

Office Action issued Aug. 8, 2023 in Japanese Application No. 2023-102724.
Office Action issued Nov. 7, 2023 in Japanese Application No. 2023-102724.
Yokouchi et al., "Grinding properties of ultrafine polycrystalline CBN wheel", KISTEC Research Report, Aug. 2020, 4 pages.

P=25GPa
$T_1$=1450°C
$t_1$=10 min.
$T_2$=1950°C
$t_2$=5 min.

IMMEDIATELY AFTER BEING HEATED TO 1ST TEMPERATURE T1

AFTER PASSAGE OF FIRST PERIOD t1 AT 1ST TEMPERATURE T1

IMMEDIATELY AFTER BEING HEATED TO 2ND TEMPERATURE T2 FROM 1ST TEMPERATURE T1

AFTER PASSAGE OF SECOND PERIOD t2 AT 2ND TEMPERATURE T2

WHEN HEATED AT 2ND TEMPERATURE T2 BEYOND SECOND PERIOD t2

Fig. 10

Table 1

| | Preparation Condition | | | | | | Measured Result | | | |
|---|---|---|---|---|---|---|---|---|---|---|
| | Material | Pressure (GPa) | 1st Temperature (°C) | 1st Period (min) | 2nd Temperature (°C) | 2nd Period (min) | Mean Grain Size (nm) | Area Ratio of Coarse : Fine : Lamellar | Knoop Hardness (GPa) | Young's Modulus (GPa) |
| Example 1 | pBN | 25 | 1450 | 10 | 1950 | 5 | 46.3 | 64:15:21 | 65.6 | 1085.7 |
| Example 2 | pBN | 25 | 1450 | 10 | 1950 | 4 | 41.6 | 64:14:24 | 65.0 | 1087.1 |
| Example 3 | pBN | 25 | 1450 | 10 | 1950 | 4.5 | 44.1 | 61:17:22 | 66.3 | 1090.2 |
| Example 4 | pBN | 25 | 1450 | 10 | 1950 | 6 | 63.6 | 65:16:19 | 64.7 | 1084.3 |
| Example 5 | pBN | 15 | 1400 | 10 | 1800 | 5 | 59.2 | 71:17:12 | 62.9 | 1083.6 |
| Example 6 | pBN | 15 | 1400 | 10 | 1700 | 5 | 55.7 | 73:16:11 | 62.6 | 1082.2 |
| Example 7 | hBN | 12 | 1400 | 10 | 1750 | 5 | 64.8 | 64:17:19 | 62.1 | 1082.0 |
| Example 8 | pBN | 10 | 1400 | 10 | 1800 | 5 | 78.3 | 68:15:17 | 60.3 | 1082.1 |
| Comparative Example 1 | pBN | 25 | 1450 | 10 | 1950 | 10 | 78.5 | 82:15:3 | 56.1 | 1055.2 |
| Comparative Example 2 | pBN | 25 | 1450 | 10 | 1950 | 15 | 188.4 | 91:8:1 | 51.5 | 987.1 |
| Comparative Example 3 | pBN | 25 | 1950 | 15 | | | 80.7 | 90:7:3 | 53.5 | 1047.2 |
| Comparative Example 4 | pBN | 15 | 1800 | 10 | | | 72.5 | 86:12:2 | 60.5 | 1022.1 |
| Comparative Example 5 | pBN | 12 | 1750 | 10 | | | 68.1 | 80:18:2 | 60.3 | 1021.6 |
| Comparative Example 6 | hBN | 12 | 1750 | 10 | | | 72.4 | 83:13:5 | 59.5 | 1020.6 |
| Comparative Example 7 | pBN | 10 | 1800 | 10 | | | 90.2 | 86:12:2 | 53.6 | 973.3 |

CUBIC BORON NITRIDE POLYCRYSTALLITE AND METHOD FOR PRODUCING THE SAME

TECHNICAL FIELD

The present invention relates to a cubic boron nitride polycrystallite used for a cutting tool, grinding tool or similar tool which must have a high level of hardness and a high level of Young's modulus, as well as a method for producing such a polycrystallite.

BACKGROUND ART

Boron nitride (BN) has three major types which have different crystal structures: hexagonal boron nitride (hexagonal BN), wurtzite boron nitride (wBN) and cubic boron nitride (cBN). Among these types of BN, cBN is characterized by its hardness which is second to diamond, as well as its thermal and chemical stabilities which exceed those of diamond. In particular, diamond easily reacts with some elements, such as iron, nickel or titanium, whereas cBN does not easily react with those elements. Therefore, cBN is suitable as a material for tools used for machining many materials containing those elements, such as a steel material, nickel alloy or titanium alloy.

Patent Literature 1 discloses a method for creating a polycrystallite made of cBN by sintering a powdered material under the condition that the temperature is not higher than 2200° C. and the pressure is not higher than 25 GPa, with the temperature and the pressure satisfying a specific inequality, where the powdered material consists of coarse-grained powder of hBN having a mean grain size equal to or larger than 1 μm and either fine powder of hBN having a mean grain size smaller than 100 nm or powder of BN different from hBN, such as amorphous BN. This cBN polycrystallite contains: a fine-grained crystal of cBN having the maximum grain size equal to or smaller than 100 nm and a mean grain size equal to or smaller than 70 nm; a plate-like crystal of cBN having a mean longest diameter between 50 nm and 10000 nm, inclusive; and a coarse-grained crystal of cBN having the minimum grain size larger than 100 nm and a mean grain size equal to or smaller than 1000 nm.

On the other hand, Non Patent Literature 1 discloses a method in which a cBN polycrystallite with a fine polycrystallite structure having a mean grain size of approximately 85 nm, with relatively coarse crystal grains mixed therein, is created by transforming pyrolytic boron nitride (pBN), which is a high-purity BN prepared by chemical vapor deposition and has a hexagonal crystal structure similar to hBN, into cBN under the condition of a pressure of 25 GPa and a temperature of 1950° C.

CITATION LIST

Patent Literature

Patent Literature 1: JP 2016-141609 A

Non Patent Literature

Non Patent Literature 1: Yoshio Ichida and five other authors, "Nano Takesshou cBN No Bisai Soshiki To Kikaiteki Seishitsu (Fine Structure of Nano-Polycrystallite cBN and its Mechanical Properties)", *Summaries of Speeches in The 60th High Pressure Conference of Japan*, issued by The Japan Society of High Pressure Science and Technology, page 157, Oct. 10, 2019

SUMMARY OF INVENTION

Technical Problem

If a cutting or grinding tool is elastically deformed in a machining process, the machining accuracy will be lowered. Therefore, the material used for those types of tools must have the characteristic that it has not only a high level of hardness but also a high level of resistance to elastic deformation. To this end, it is necessary to increase the Young's modulus which is an index of the resistance to elastic deformation. Patent Literature 1 includes no description concerning the Young's modulus of the obtained cBN polycrystallite. Non Patent Literature reports that the obtained cBN polycrystallite had a Knoop hardness of 55.2 GPa and a Young's modulus of 1081.5 GPa. However, it is desirable to create a cBN polycrystallite having a higher level of Young's modulus along with a Knoop hardness comparable to or even higher than the aforementioned value.

The problem to be solved by the present invention is to provide a cBN polycrystallite having a high level of Knoop hardness and a high level of Young's modulus, as well as a method for producing such a polycrystallite.

Solution to Problem

A cubic boron nitride polycrystallite (cBN polycrystallite) according to the present invention developed for solving the previously described problem is characterized in that the polycrystallite includes a mixture of:
  a fine-grained crystal made of cubic boron nitride, with a grain size within a range from 10 to 60 nm;
  a coarse-grained crystal made of cubic boron nitride, with a grain size within a range from 100 to 250 nm; and
  a lamellar crystal consisting of a plurality of stacked plate-like crystals of cubic boron nitride, with the maximum length in a direction perpendicular to the stacking direction equal to or less than 1000 nm and an aspect ratio smaller than 3, where the aspect ratio is defined as the aforementioned maximum length divided by the thickness which is the maximum length in the stacking direction, and
a mean grain size of the fine-grained crystal, the coarse-grained crystal and the lamellar crystal combined is equal to or smaller than 80 nm.

The "mean grain size of the fine-grained crystal, the coarse-grained crystal and the lamellar crystal combined" is a value determined by an intercept method using a transmission electron microscope (TEM) image based on the Japanese Industrial Standard JIS G 0551:2013 (Steels—Micrographic determination of the apparent grain size). In the intercept method, a circle is drawn on a TEM image. Six line segments (diameters) passing through the center of the circle (or twelve radii of the circle) are drawn at angular intervals of 30 degrees. The number of crystal grains lying across each line (in the present invention, the total number of the fine-grained, coarse-grained and lamellar crystals) is counted (it should be noted that a crystal grain including an end of a line segment should be counted as 0.5 grain), and the total of the numbers of grains on all lines are calculated (this total value is defined as the "crystal grain number"). The mean grain size is ultimately obtained by multiplying the diameter by six and dividing it by the crystal grain number. There is no specific limitation on the diameter of the circle to be drawn on the TEM image, although the diameter should preferably be determined so that the number of crystal grains lying on one diameter will be approximately within a range from 10 to 40. It is also preferable that the TEM image be taken at a plurality of locations for one cBN polycrystallite, and the mean grain size be determined by averaging the values obtained at those locations.

The grain size d of each individual fine-grained or coarse-grained crystal can be approximately determined by drawing an ellipse which approximates the shape of each individual crystal in the TEM image and calculating $d=(a+b)/2$, where a and b are the lengths of the major and minor axes of the ellipse, respectively, measured on the TEM image. Another possible method is to calculate the area S of the ellipse by $S=\pi \times a \times b$, using the lengths a and b of the major and minor axes of the ellipse measured in the previously described manner, and calculate the grain size d as the equivalent circle diameter: $d=2\times(S/\pi)^{1/2}$. Some commercially available image processing software products are capable of automatically performing the task of determining the contour of a crystal grain included in an image and calculating the equivalent circle diameter for the grain. This type of image processing software may also be used to determine an equivalent circle diameter from a TEM image as the grain size d.

Due to the mixture of the fine-grained crystal, lamellar crystal and coarse-grained crystal of cBN, the cBN polycrystallite according to the present invention can achieve a Knoop hardness equal to or higher than 60 GPa as well as a Young's modulus equal to or higher than 1082 GPa.

The mean grain size of the fine-grained crystal, the coarse-grained crystal and the lamellar crystal combined should preferably be equal to or smaller than 60 nm. This enables a further increase in Knoop hardness and Young's modulus.

The cBN polycrystallite according to the present invention can be produced by the following method: A method for producing a cubic boron nitride polycrystallite (cBN polycrystallite) according to the present invention is characterized by performing, under a pressure equal to or higher than 10 GPa, the successive steps of heating a material made of hexagonal system boron nitride to a first temperature within a range from 1300° to 1600° C., maintaining the material at the first temperature for a first predetermined period of time, heating the material to a second temperature within a range from 1700° to 2100° C., maintaining the material at the second temperature for a second predetermined period of time, and cooling the material.

The "hexagonal system boron nitride" used as the material includes hBN and pBN mentioned earlier.

In the method for producing a cBN polycrystallite according to the present invention, heating the aforementioned material to the first temperature under a pressure equal to or higher than 10 GPa causes the largest portion of the material to be transformed into a granular crystal of cBN due to the diffusive transformation from hBN, and the remaining portion to be transformed into a lamellar crystal of wBN due primarily to non-diffusive transformation (martensitic transformation). The result of these processes is a crystal structure in which the aforementioned granular crystal of cBN and the lamellar crystal of wBN are mixed. Furthermore, during the first predetermined period of time, the lamellar crystal of wBN partially changes to a lamellar crystal of cBN, while the largest portion maintains the form of the lamellar crystal of wBN. However, during the first predetermined period of time, the lamellar crystal of wBN will be pulverized into finer grains since this crystal is mixed with the granular crystal of cBN and the lamellar crystal of cBN, both being harder than the lamellar crystal of wBN, under the ultra-high pressure.

When the temperature of this crystal structure in which the granular crystal of cBN, lamellar crystal of cBN and pulverized lamellar crystal of wBN are mixed is increased to the second temperature, the largest portion of the pulverized lamellar crystal of wBN changes to the lamellar crystal of cBN due to the martensitic transformation. A small amount of lamellar crystal of wBN which still remains immediately after the temperature has been increased to the second temperature will be entirely transformed into the lamellar crystal of cBN during the second predetermined period of time. The resultant product is an entirely single-phase cBN polycrystallite. The lamellar crystal of cBN has lattice defects, such as twin crystals or stacking faults, abundantly formed on its surface or in its inner areas, contributing to the increase in the hardness and the Young's modulus of the polycrystallite.

With the passage of the heating period at the second temperature, a new core of cBN is formed around a dangling bond (or the like) in the vicinity of a lattice defect, giving rise to recrystallization, i.e., the growth of a new crystal grain. Since this recrystallization occurs under the ultra-high pressure, a fine-grained crystal of cBN is thereby formed. This is a type of dynamic recrystallization, in which a considerable amount of distortion and defects are also introduced into the fine-grained crystal of cBN, contributing to the increase in the hardness and the Young's modulus of the polycrystallite. A portion of the lamellar crystal of cBN does not cause this type of dynamic recrystallization; it remains unchanged, maintaining its form as well as its role as a contributor to the increase in the hardness and the Young's modulus of the polycrystallite. On the other hand, the granular crystal of cBN resulting from the heating at the first temperature gradually grows to be a coarse-grained crystal of cBN with the subsequent increase of the heating temperature to the second temperature and the passage of the period of time during which the temperature is maintained at this level. Since this granular growth also occurs under ultra-high pressure, a considerable amount of distortion and defects of the crystal lattice are present in the coarse-grained crystal of cBN, contributing to the increase in the hardness and the Young's modulus of the polycrystallite. By the processes described thus far, a cBN polycrystallite according to the present invention is obtained in which the three forms of crystals, i.e., the fine-grained crystal of cBN, lamellar crystal of cBN and coarse-grained crystal of cBN, are mixed.

However, if the heating period at the second temperature is too short, a portion of the lamellar crystal of wBN will remain without being transformed into the lamellar crystal of cBN. Conversely, if the heating period at the second temperature is too long, the lamellar crystal will be entirely recrystallized and lost, while the already created fine-grained crystal will further grow to be coarse grains. The already coarse-grained crystal also becomes even larger in grain size, so that the general structure of the cBN polycrystallite will be coarse. Accordingly, the second predetermined period of time should be determined by a preliminary experiment so that the lamellar crystal of wBN will not remain while all of the fine-grained, coarse-grained and lamellar crystals of cBN will remain. The abundance ratio of the fine-grained crystal, coarse-grained crystal and lamellar crystal should preferably be within a range of (13-20):(60-75):(10-30) in area ratio. According to an experiment by the present inventors, for example, when the pressure is within a range from 10 to 25 GPa, the second temperature is within a range from 1700° to 1950° C. and the second predetermined period of time is within a range from 4 to 7 minutes, then it is possible to prevent the lamellar crystal of wBN from remaining while allowing all of the fine-grained, coarse-grained and lamellar crystals of cBN to remain, thereby achieving a Knoop hardness equal to or higher than 60 GPa as well as a Young's modulus equal to or higher than 1082 GPa.

If the first predetermined period of time is too long, a higher percentage of the lamellar crystal of wBN will be transformed into the lamellar crystal of cBN during the heating at the first temperature, making it more difficult for the lamellar crystal of wBN to remain, which means that the pulverization of the lamellar crystal of wBN into finer grains will less likely occur. Consequently, a coarse lamellar crystal of cBN with an aspect ratio equal to or larger than 3 will be obtained through the subsequent heating process at the second temperature. This means that the general structure of the cBN polycrystallite will be coarse, so that a sufficiently high level of Knoop hardness cannot be achieved. Therefore, the first predetermined period of time should also be determined by a preliminary experiment so that the Knoop hardness will exceed 60 GPa.

Advantageous Effects of Invention

According to the present invention, it is possible to obtain a cubic boron nitride polycrystallite (cBN polycrystallite) having both a high level of Knoop hardness which equals or even exceeds 60 GPa and a high level of Young's modulus which equals or even exceeds 1082 GPa.

BRIEF DESCRIPTION OF DRAWINGS

FIG. 10 is a Table showing a sample preparation condition and measured results for Examples 1-8.

DESCRIPTION OF EMBODIMENTS

An embodiment of the cBN polycrystallite and its production method according to the present invention is hereinafter described by means of FIGS. 1-9.

Figure 1:
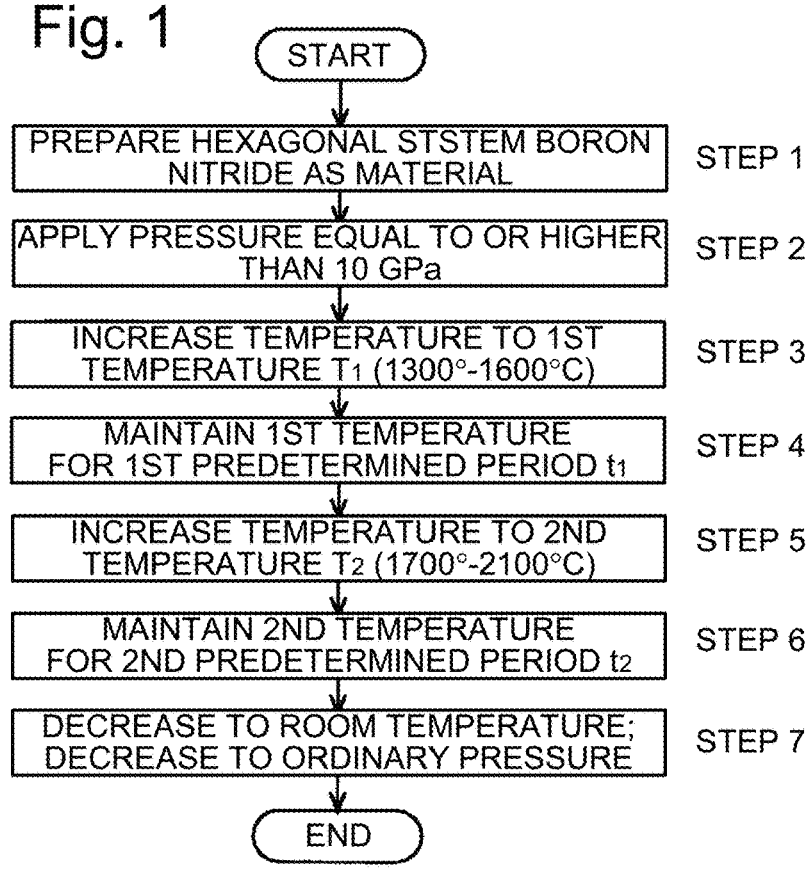
FIG. 1 is a flowchart showing one embodiment of the method for producing a cBN polycrystallite according to the present invention.
Figure 2:
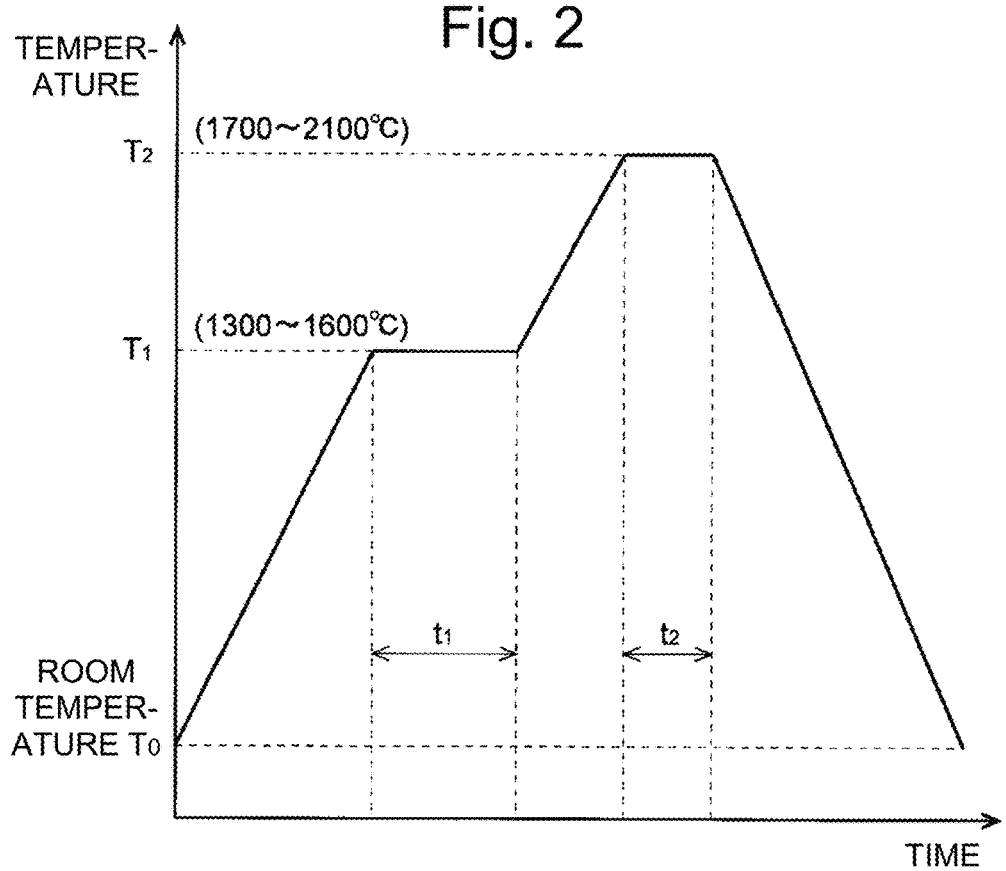
FIG. 2 is a graph showing the relationship between the heating temperature and time in the method for producing a cBN polycrystallite according to the present embodiment.

The description initially deals with the method for producing a cBN polycrystallite according to the present embodiment, referring to the flowchart in FIG. 1 and the graph in FIG. 2.

A hexagonal system boron nitride (BN) is initially prepared as a material (Step 1). Both hexagonal boron nitride (hBN) and wurtzite boron nitride (wBN) can be used as the hexagonal system BN. In the examples and comparative examples (which will be described later), pBN was prepared by cutting a commercially available pBN plate (plate thickness, 3 mm) into a disc-shaped piece with a diameter of 3 mm and a height of 3 mm by means of a laser machining device, while hBN was prepared by filling an ultra-hard powder-molding dies having an inner diameter of 3 mm with powdered hBN and compressing this powder by a pressure of 200 MPa to obtain a pellet-shaped material having a diameter of 3 mm and a height of 3 mm.

Pressure P, which is equal to or higher than 10 GPa, is subsequently applied to those pieces of materials (Step 2). There is no specific upper limit of this pressure P. With this pressure P maintained, the temperature of the materials is increased from room temperature to a first temperature $T_1$ within a range from 1300° to 1600° C., and more preferably within a range from 1350° to 1500° C. (Step 3). The rate of temperature increase should preferably be within a range from 50° to 120° C./min. With the pressure P maintained, the first temperature $T_1$ is maintained for a first predetermined period of time $t_1$ ("first period"; Step 4). The first period $t_1$ is appropriately determined by a preliminary experiment, along with the second predetermined period of time $t_2$ ("second period"), which will be described later.

After the first period $t_1$ has passed, the temperature is increased from the first temperature $T_1$ to a second temperature $T_2$ which is within a range from 1700° to 2100° C., and more preferably within a range from 1700° to 1950° C., while the pressure P is maintained (Step 5). Once again, the rate of temperature increase should preferably be within a range from 50° to 120° C./min. With the pressure P maintained, the second temperature $T_2$ is maintained for a second predetermined period of time $t_2$ ("second period"; Step 6). After the second period $t_2$ has passed, the temperature is decreased to room temperature, and the pressure P is subsequently lowered to ordinary pressure (Step 7) to obtain the cBN polycrystallite according to the present embodiment.

Figure 3:
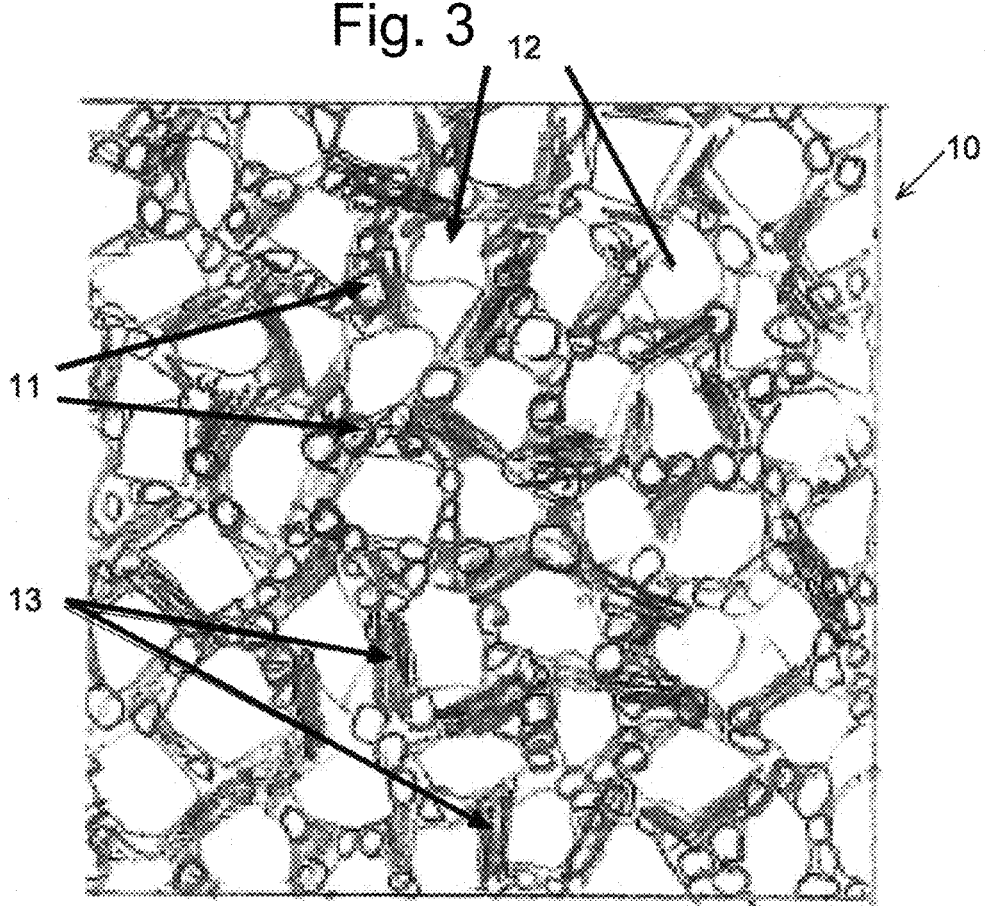
FIG. 3 is a diagram schematically showing the cBN polycrystallite according to the present embodiment.

FIG. 3 schematically shows the cBN polycrystallite 10 according to the present embodiment. The cBN polycrystallite 10 includes a fine-grained crystal 11, coarse-grained crystal 12 and lamellar crystal 13 mixed, all of which are made of cBN. The grain size of the fine-grained crystal 11 is within a range from 10 to 60 nm, while that of the coarse-grained crystal 12 is within a range from 100 to 250 nm. The lamellar crystal 13 consists of a plurality of plate-like crystals stacked. The lamellar crystal 13 has a maximum length equal to or smaller than 1000 nm in a direction perpendicular to the stacking direction of the plate-like crystals. Its aspect ratio, defined as the aforementioned maximum length divided by the thickness which is the maximum size in the stacking direction, is smaller than 3. Since each individual plate-like crystal approximately has a thickness of a few to 10 nm, the aspect ratio being smaller than 3 means that each lamellar crystal 13 consists of a considerable number of plate-like crystals stacked.

Figure 4:
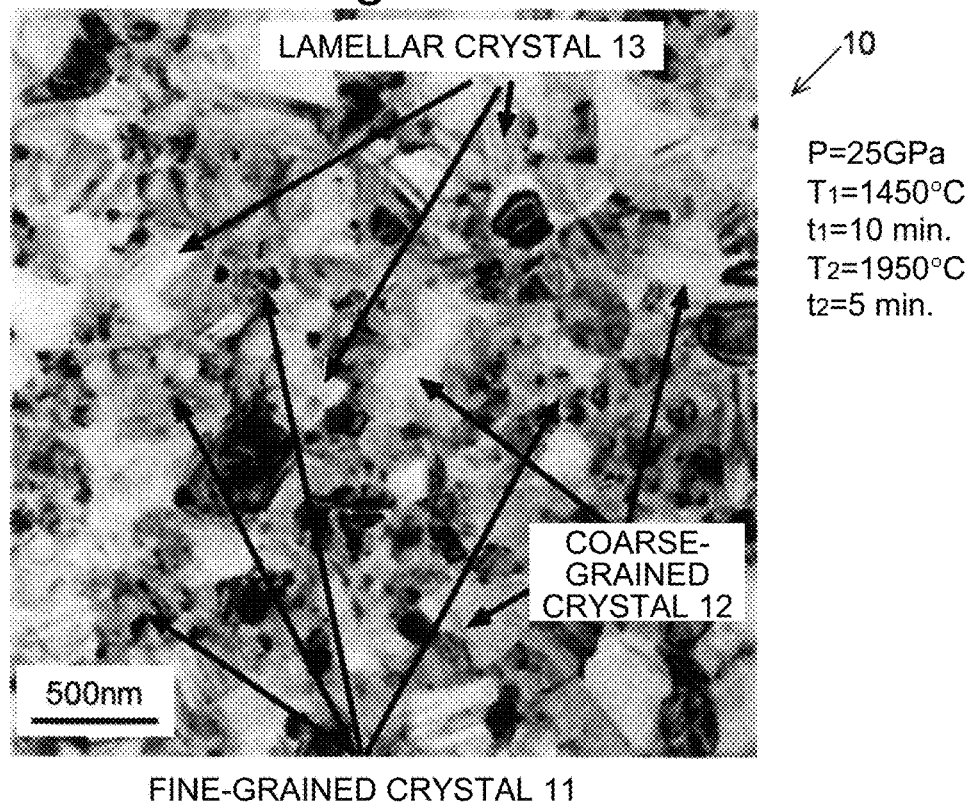
FIG. 4 is a transmission electron microscope (TEM) image of one example of the cBN polycrystallite according to the present embodiment.

FIG. 4 shows a transmission electron microscope (TEM) image of one example ("Example 1") of the cBN polycrystallite 10 according to the present embodiment, created by the previously described method. In Example 1, using the pBN mentioned earlier as the material, the cBN polycrystallite 10 was created under the following conditions: pressure P=25 GPa; first temperature $T_1$=1450° C.; first period $t_1$=10 minutes; second temperature $T_2$=1950° C. and second period $t_2$=5 minutes. As shown in FIG. 4, the obtained cBN polycrystallite 10 includes a fine-grained crystal 11, coarse-grained crystal 12 and lamellar crystal 13 mixed. The abundance ratio of the fine-grained crystal 11, coarse-grained crystal 12 and lamellar crystal 13 in this sample was 64:15:21 in area ratio. The mean grain size of the fine-grained crystal 11, coarse-grained crystal 12 and lamellar crystal 13 combined was 46.3 nm.

Figure 5A:
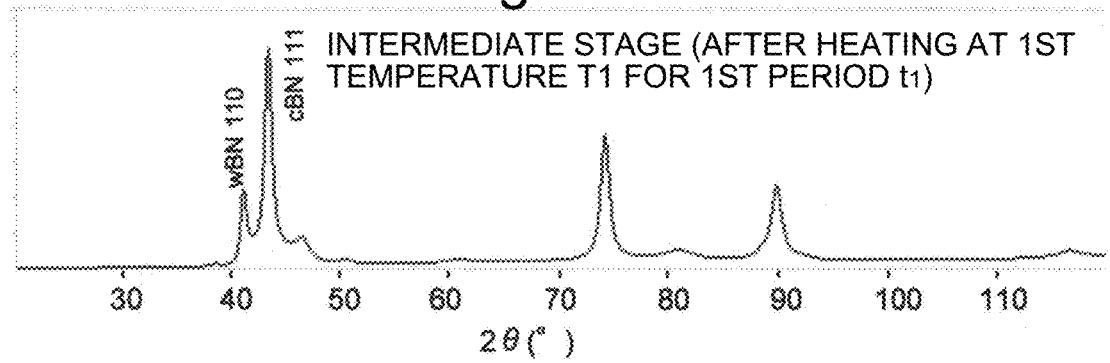
FIG. 5A is a chart showing the result of an X-ray diffraction measurement of a sample which was quenched after being heated at the first temperature for the first period of time (without the heat treatment at the second temperature).
Figure 5B:
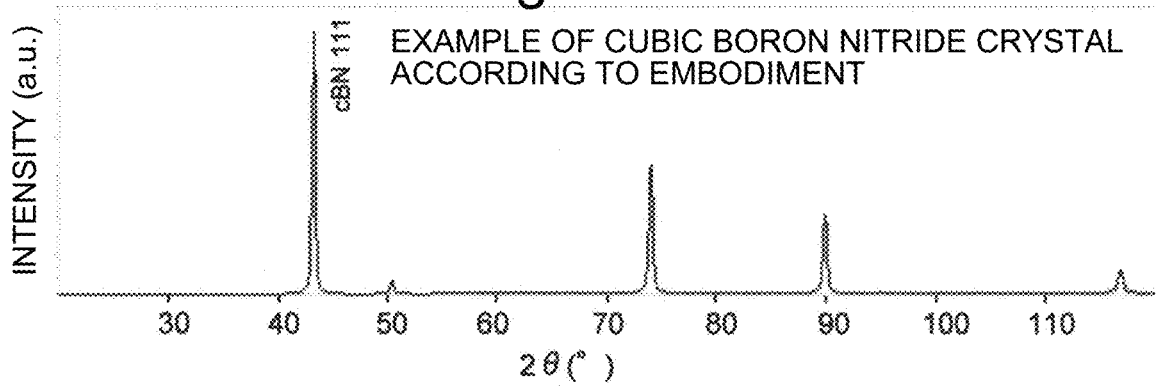
FIG. 5B is a chart showing the result of an X-ray diffraction measurement performed on the cBN polycrystallite shown in FIG. 4.

FIG. 5B shows the result of an X-ray diffraction measurement using the X-ray of CuK-alpha radiation (wavelength, 15.4 nm) performed on the cBN polycrystallite 10 in Example 1. Additionally, for comparison, FIG. 5A shows the result of a similar X-ray diffraction measurement performed on a sample quenched after being subjected to the heat treatment at the first temperature $T_1$ for the first period $t_1$ (without the heat treatment at the second temperature). The latter sample corresponds to an intermediate stage in the production of the cBN polycrystallite in Example 1. In FIG. 5A, a peak originating from wBN is present besides a peak originating from cBN. By comparison, the peak originating from wBN is not present in FIG. 5B. This confirms that the cBN polycrystallite 10 in Example 1 was a single-phase cBN polycrystallite.

Figure 6A:
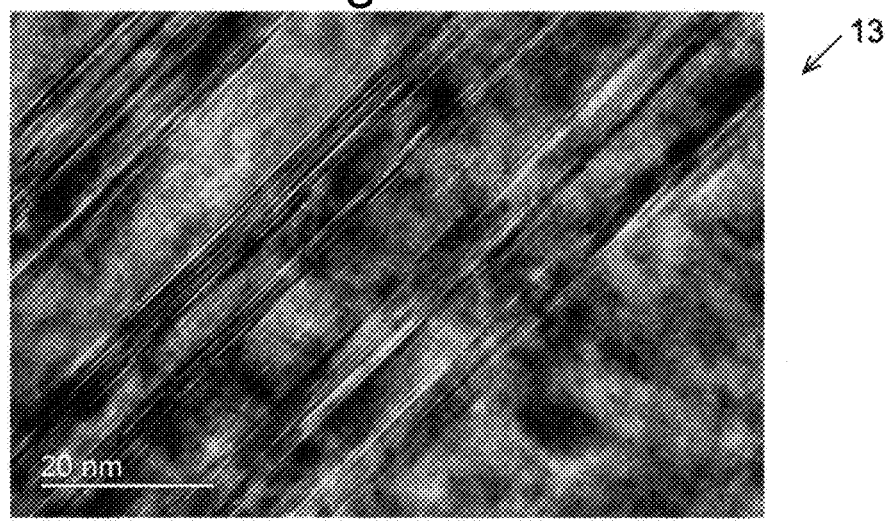
FIG. 6A is a high-resolution transmission electron microscope (HR-TEM) image showing an enlarged view of a lamellar crystal in one example of the cBN polycrystallite according to the present embodiment.
Figure 6B:
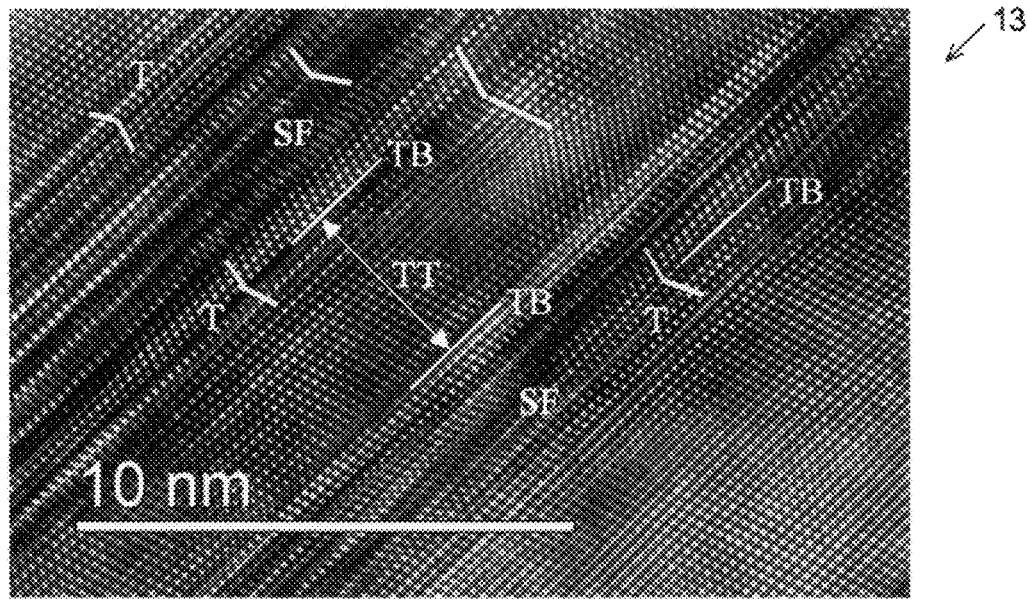
FIG. 6B is a HR-TEM image showing a further enlarged view of the lamellar crystal in one example of the cBN polycrystallite according to the present embodiment.

For a detailed examination of the structure of the lamellar crystal 13, enlarged views of a portion of the lamellar crystal 13 in the cBN polycrystallite 10 shown in FIG. 4 were taken. Specifically, FIG. 6A is a HR-TEM (high-resolution transmission electron microscope) image showing an enlarged view of the aforementioned portion, and FIG. 6B is a HR-TEM image showing a further enlarged view. These images demonstrate the stacked state of the plate-like crystals. FIG. 6B particularly shows that the plate-like crystals are stacked on the {111} planes within the lamellar crystal 13, and that a considerable number of twin crystals T having those planes as the twin boundaries TB are formed. The intervals TT between the twin boundaries TB are equal to or less than 10 nm. A plurality of stacking faults SF are also formed within the lamellar crystal 13. The presence of the twin crystals T and the stacking faults SF within the lamellar crystal 13 are considered to be one of the contributors to an increase in the Knoop hardness and the Young's modulus of the cBN polycrystallite 10. The twin crystals T and the stacking faults SF also play the role of preventing crack propagation within the cBN polycrystallite 10.

The Knoop hardness and the Young's modulus of the cBN polycrystallite 10 in Example 1 were actually measured. The Knoop hardness was 65.6 GPa, and the Young's modulus was 1085.7 GPa. Thus, the cBN polycrystallite 10 in Example 1 had both a high level of Knoop hardness which exceeded 60 GPa and a high level of Young's modulus which exceeded 1082 GPa, which is higher than that of the conventional cBN polycrystallite.

Figure 7:
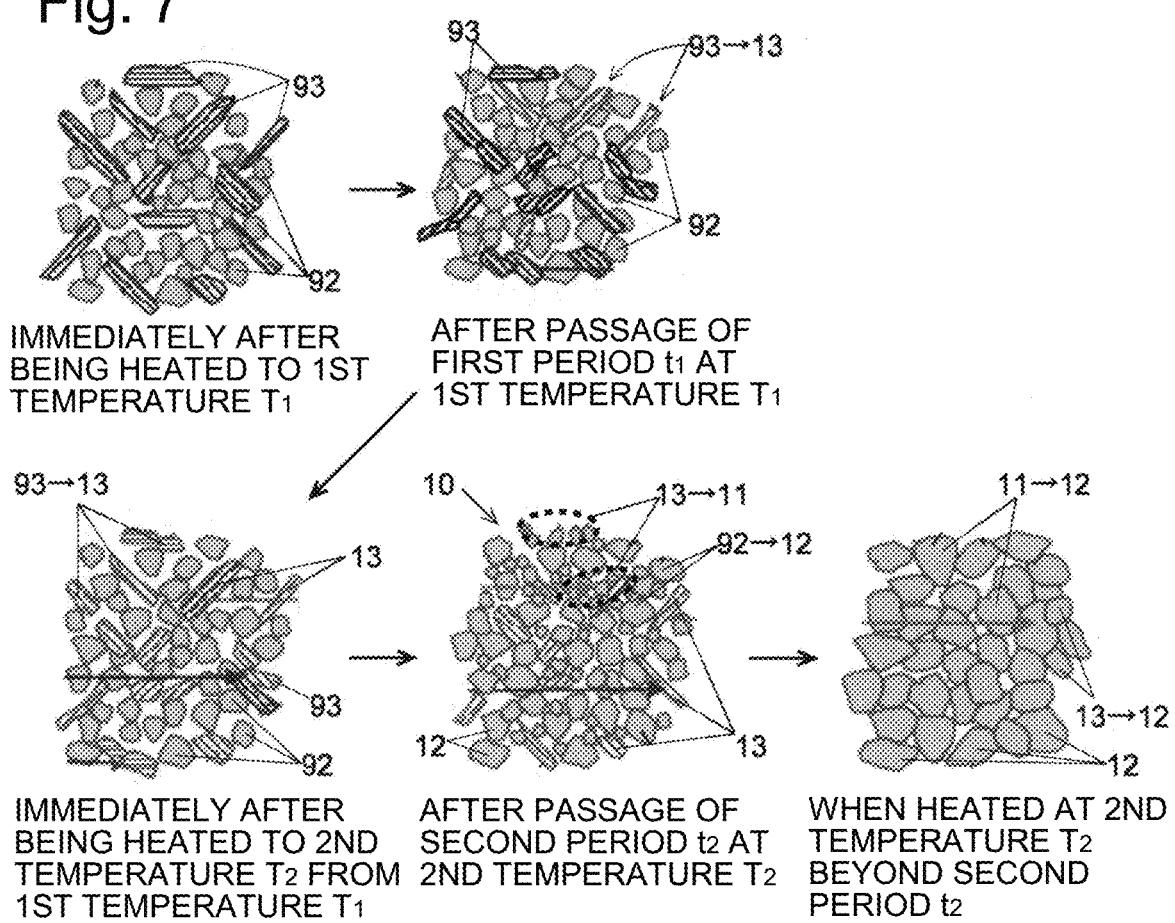
FIG. 7 is a schematic diagram illustrating the process of obtaining a cBN polycrystallite according to the present embodiment.

A process of the creation of such a cBN polycrystallite 10 is hereinafter illustrated by means of FIG. 7. When the material made of hexagonal system BN is initially heated to the first temperature $T_1$ under a pressure equal to or higher than 10 GPa, the granular crystal 92 of cBN and the lamellar crystal 93 of wBN are formed (upper left panel in FIG. 7). When this first temperature $T_1$ is maintained for the first period $t_1$, a portion of the lamellar crystal 93 of wBN changes to the lamellar crystal 13 of cBN due to martensitic transformation (upper right panel in FIG. 7), while the largest portion remains in the form of the lamellar crystal 93 of wBN. During this period, the remaining portion of the lamellar crystal 93 of wBN is pulverized into finer grains by the lamellar crystal 13 and the granular crystal 92 of cBN, which is harder than wBN, under the high pressure. When the temperature is further increased from the first temperature $T_1$ to the second temperature $T_2$, the phase transformation from the pulverized lamellar crystal 93 of wBN into the lamellar crystal 13 of cBN further progresses (lower left panel in FIG. 7). While the second temperature $T_2$ is maintained for the second period $t_2$, the lamellar crystal 93 of wBN entirely changes to the lamellar crystal 13 of cBN (lower middle panel in FIG. 7). Additionally, while the second temperature $T_2$ is maintained for the second period $t_2$, dynamic recrystallization occurs in which a new core of cBN is formed from a dangling bond (or the like) in the vicinity of a lattice defect formed at a portion of the lamellar crystal 13 of cBN, and the core grows to be a new, fine crystal of cBN. Consequently, a portion of the lamellar crystal 13 of cBN changes to a fine-grained crystal 11 of cBN (lower middle panel in FIG. 7). Thus, a cBN polycrystallite 10 in which the fine-grained crystal 11 of cBN, coarse-grained crystal 12 of cBN and lamellar crystal 13 of cBN are mixed is obtained. It should be noted that the second period $t_2$ should be set so that the lamellar crystal 93 of wBN will entirely change to the lamellar crystal 13 of cBN since the lamellar crystal 93 of wBN would partially remain if the second period $t_2$ was too short.

Further continuing the heating at the second temperature $T_2$ beyond the second period $t_2$ would cause the lamellar crystal 13 of cBN to entirely change to the fine-grained crystal 11 of cBN and lost due to the dynamic recrystallization. Furthermore, the fine-grained crystal 11 of cBN formed during a period of time before and after the end of the second period $t_2$ would additionally grow to be coarse grains (lower right panel in FIG. 7). These changes prevent the resulting cBN polycrystallite from having as high levels of Knoop hardness and Young's modulus as those of the cBN polycrystallite 10 according to the present embodiment. Accordingly, it is necessary to set the second period $t_2$ so that both the fine-grained crystal 11 of cBN and the lamellar crystal 13 of cBN will remain.

The aforementioned condition of the second period $t_2$ can be determined in a preliminary experiment by preparing a plurality of samples with different values of the second period $t_2$ and examining the created crystal on a TEM image or performing an X-ray diffraction measurement for determining whether or not there is a wBN portion remaining for each of those samples. Alternatively, the Knoop hardness and the Young's modulus may be measured for each of the samples prepared in the previously described manner, in which case a sample having a Knoop hardness equal to or higher than 60 GPa and a Young's modulus equal to or higher than 1082 GPa can be presumed to satisfy the requirements concerning the three types of crystals.

Next, a sample of the cBN polycrystallite 10 was created under each of the conditions which are different from each other in terms of the first temperature and the first period, the second temperature and the second period, as well as the pressure. The mean grain size, the abundance ratio (in area ratio) of the fine-grained crystal 11, coarse-grained crystal 12 and lamellar crystal 13, as well as the Knoop hardness and the Young's modulus were measured for each of the created samples (Examples 2-8). A similar measurement was also performed for Comparative Examples 1 and 2 in which the second period was longer than in Examples 1-7. A similar measurement was also performed for Comparative Examples 3-7 which were prepared by a heating treatment with the temperature increased from room temperature to a predetermined temperature and maintained at this level for a predetermined period of time, instead of the two-stage heating treatment using the first and second temperatures. FIG. 10 is a Table 1 showing the sample preparation condition and the measured results for Examples 1-8, including Example 1 described earlier, and Comparative Examples 1-7. It should be noted that, for Comparative Examples 3-7, the heating temperature and the period of time during which the temperature was maintained are shown in the columns of the first temperature and the first period for convenience, although they do not correspond to the first temperature and the first period in the present invention.

Any of the samples in Examples 1-8 has a mean grain size equal to or smaller than 80 nm and includes all of the fine-grained, coarse-grained and lamellar crystals 11, 12 and 13, with no middle-grained crystal. Any of those samples in Examples 1-8 has a high value of Knoop hardness which is equal to or higher than 60 GPa as well as a high value of Young's modulus which is equal to or higher than 1082 GPa. In contrast, in Comparative Examples 1-7, the abundance of the lamellar crystal 13 is either practically zero or negligibly low which is not higher than 5% in area ratio. In particular, in Comparative Examples 1 and 2, although the two-stage heating treatment using the first and second temperatures was performed as in Examples 1-8, both the Knoop hardness and the Young's modulus were lower than those of Examples 1-8 since the abundance of the lamellar crystal 13 was decreased to zero or a negligibly low level due to the second period being longer than in Examples 1-8 (i.e., 4-6 minutes in Examples 1-8 and 10-15 minutes in Comparative Examples 1 and 2).

Figure 8:
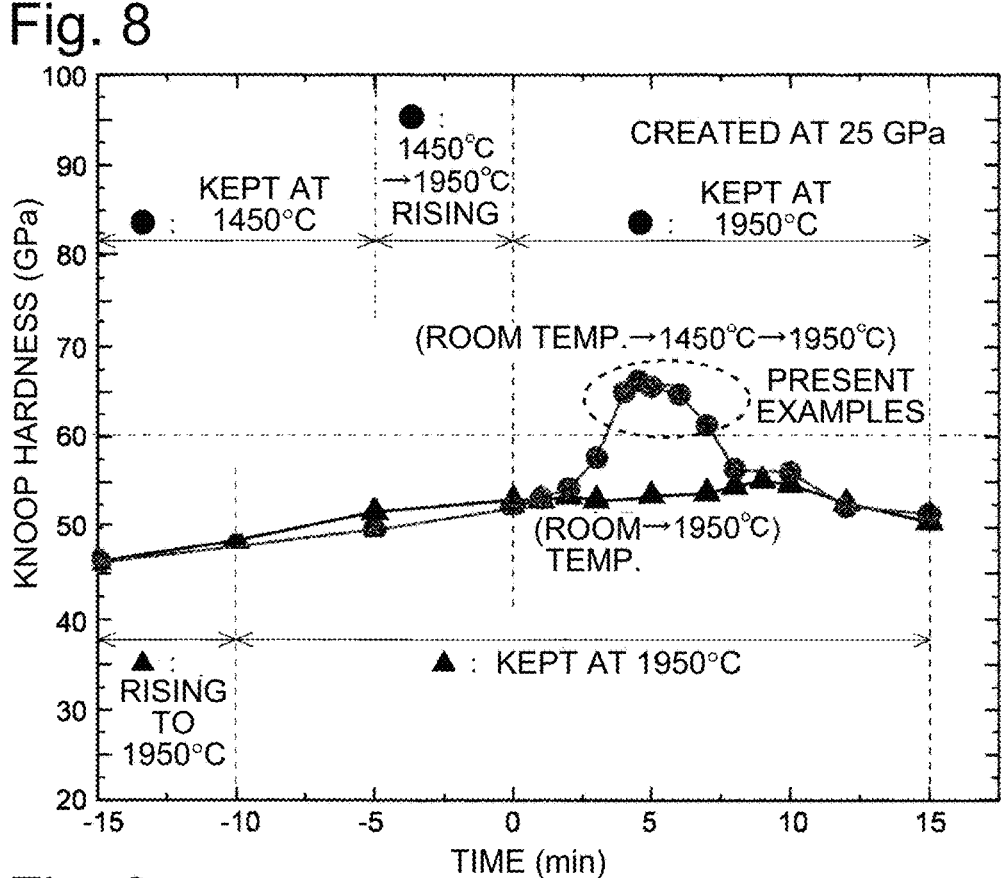
FIG. 8 is a graph showing the relationship between the second period $t_2$ in the creation process and the measured value of the Knoop hardness of the created cBN polycrystallite.
Figure 9:
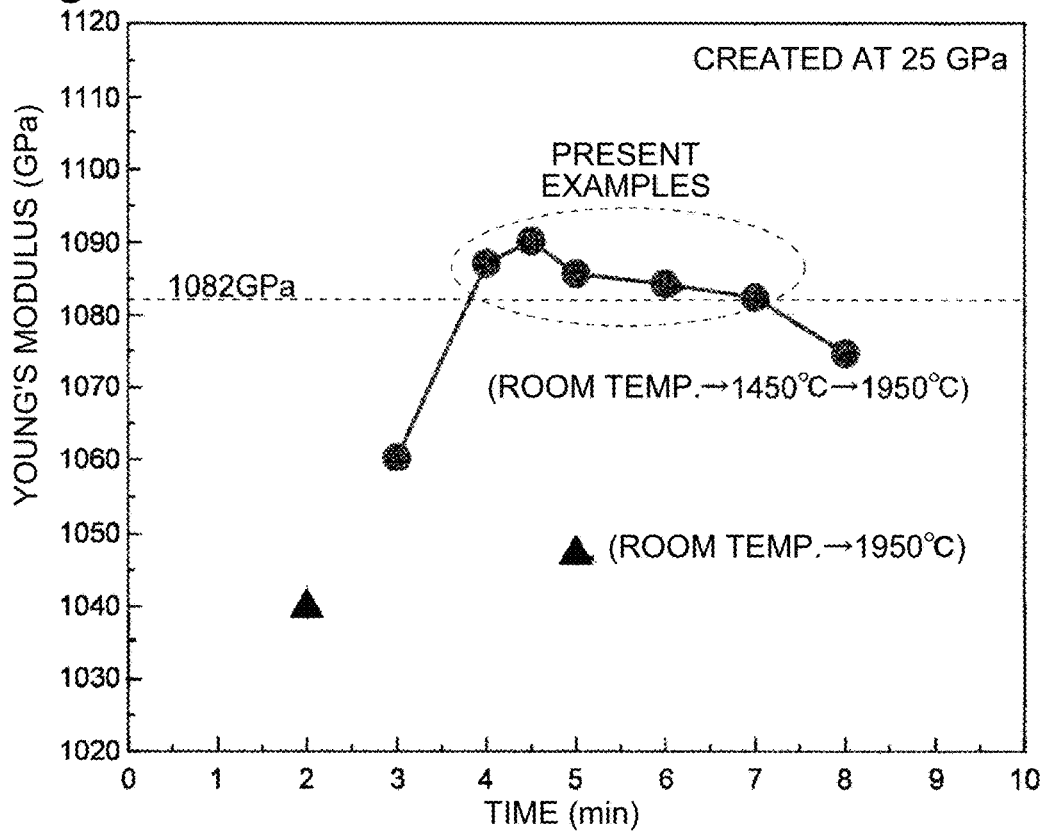
FIG. 9 is a graph showing the relationship between the second period $t_2$ in the creation process and the measured value of the Young's modulus of the created cBN polycrystallite.

Next, FIGS. 8 and 9 graphically show the Knoop hardness (FIG. 8) and the Young's modulus (FIG. 9) measured for the examples created with different values of the second period in the cases where the pressure in the creation process was 25 GPa, the first temperature was 1450° C., the first period was 10 minutes, and the second temperature was 1950° C. (including Examples 1-4, Comparative Examples 1 and 2 as well as other examples created with different values of the second period). FIGS. 8 and 9 also show the results obtained for three other comparative examples: a sample which was cooled to room temperature without being heated to higher temperatures after being maintained at the first temperature (1450° C.) for a predetermined period of time, a sample which was immediately cooled after the second temperature was reached (the second period was zero), and a sample which was directly heated from room temperature to 1950° C., bypassing the two-stage heating treatment using the first and second temperatures, and was subsequently maintained at that temperature for a predetermined period of time. FIGS. 8 and 9 demonstrate that a Knoop hardness equal to or higher than 60 GPa and a Young's modulus equal to or higher than 1082 GPa can be achieved when the second period is within a range from 4 to 7 minutes.

Due to its characteristically high levels of Knoop hardness and Young's modulus, the cBN polycrystallite 10 obtained in the present embodiment can be suitably used as a material for the cutting edge of a cutting tool or the abrasive grains of a grinding tool. The cBN polycrystallite 10 is also suitable for an indenter for hardness measurement.

REFERENCE SIGNS LIST

10 . . . Cubic Boron Nitride (cBN) Polycrystallite
11 . . . Fine-Grained Crystal (of cBN)
12 . . . Coarse-Grained Crystal (of cBN)
13 . . . Lamellar Crystal (of cBN)
92 . . . Granular Crystal of cBN
93 . . . Lamellar Crystal of wBN
SF . . . Stacking Fault
T . . . Twin Crystal
TB . . . Twin Boundary
TT . . . Interval

The invention claimed is:

1. A cubic boron nitride polycrystallite, characterized in that:
the polycrystallite includes a mixture of:
a fine-grained crystal made of cubic boron nitride, with a grain size within a range from 10 to 60 nm;
a coarse-grained crystal made of cubic boron nitride, with a grain size within a range from 100 to 250 nm; and
a lamellar crystal consisting of a plurality of stacked plate-like crystals of cubic boron nitride, the lamellar crystal having a maximum length in a direction perpendicular to a stacking direction equal to or less than 1000 nm and an aspect ratio smaller than 3, where the aspect ratio is defined as the maximum length in the direction perpendicular to the stacking direction divided by a maximum length in the stacking direction;
an area ratio of the fine-grained crystal, the coarse grained crystal and the lamellar crystal in a transmission electron microscope image of the cubic boron nitride polycrystallite is within a range of (13-20):(60-75):(10-30); and
a mean grain size of the fine-grained crystal, the coarse-grained crystal and the lamellar crystal combined is equal to or smaller than 80 nm.

2. The cubic boron nitride polycrystallite according to claim 1, characterized in that the mean grain size of the fine-grained crystal, the coarse-grained crystal and the lamellar crystal combined is equal to or smaller than 60 nm.

3. A method for producing a cubic boron nitride polycrystallite according to claim 1, characterized by performing, under a pressure equal to or higher than 10 GPa, successive steps of heating a material made of hexagonal system boron nitride to a first temperature within a range from 1300° to 1600° C., maintaining the material at the first temperature for a first predetermined period of time, heating the material to a second temperature within a range from 1700° to 2100° C., maintaining the material at the second temperature for a second predetermined period of time, and cooling the material.

4. A method for producing a cubic boron nitride polycrystallite according to claim 2, characterized by performing, under a pressure equal to or higher than 10 GPa, successive steps of heating a material made of hexagonal system boron nitride to a first temperature within a range from 1300° to 1600° C., maintaining the material at the first temperature for a first predetermined period of time, heating the material to a second temperature within a range from 1700° to 2100° C., maintaining the material at the second temperature for a second predetermined period of time, and cooling the material.

5. A cutting tool, comprising a cutting edge made of the cubic boron nitride polycrystallite according to claim 1.

6. A cutting tool, comprising a cutting edge made of the cubic boron nitride polycrystallite according to claim 2.

7. A grinding tool, comprising abrasive grains made of the cubic boron nitride polycrystallite according to claim 1.

8. A grinding tool, comprising abrasive grains made of the cubic boron nitride polycrystallite according to claim 2.

9. An indenter for hardness measurement, characterized by being made of the cubic boron nitride polycrystallite according to claim 1.

10. An indenter for hardness measurement, characterized by being made of the cubic boron nitride polycrystallite according to claim 2.

\* \* \* \* \*